United States Patent
Goodenough et al.

(10) Patent No.: US 6,391,493 B1
(45) Date of Patent: May 21, 2002

(54) CATHODE MATERIALS FOR SECONDARY (RECHARGEABLE) LITHIUM BATTERIES

(75) Inventors: John B. Goodenough, Austin, TX (US); Akshaya K. Pahdi, LaSalle, IL (US); K. S. Nanjundaswamy, Joplin, MO (US); Christian Masquelier, Boulogne Billancourt (FR)

(73) Assignee: The University of Texas Systems, Austin, TX (US)

( * ) Notice: Subject to any disclaimer, the term of this patent is extended or adjusted under 35 U.S.C. 154(b) by 0 days.

(21) Appl. No.: 09/298,080

(22) Filed: Apr. 23, 1999

Related U.S. Application Data

(62) Division of application No. 08/840,523, filed on Apr. 21, 1997, now Pat. No. 5,910,382.
(60) Provisional application No. 60/032,346, filed on Dec. 4, 1996, and provisional application No. 60/016,060, filed on Apr. 23, 1996.

(51) Int. Cl.[7] ................................. H01M 4/58
(52) U.S. Cl. .................. 429/218.1; 429/231.1
(58) Field of Search .................. 429/218.1, 231.1, 429/231.2, 231.3

(56) References Cited

U.S. PATENT DOCUMENTS

| | | | |
|---|---|---|---|
| 4,465,747 A | 8/1984 | Evans | 429/194 |
| 4,959,281 A | 9/1990 | Nishi et al. | |
| 4,985,317 A | * 1/1991 | Adachi et al. | 429/191 |
| 5,514,490 A | 5/1996 | Chen et al. | 429/191 |
| 5,721,070 A | 2/1998 | Shackle | 429/218 |
| 5,871,866 A | * 2/1999 | Barker et al. | 429/231.1 |
| 6,085,015 A | * 7/2000 | Armand et al. | 385/140 |

FOREIGN PATENT DOCUMENTS

| | | |
|---|---|---|
| EP | 0 571 858 | 1/1993 |
| JP | 9-134725 | 5/1997 |
| JP | 11-25983 | 1/1999 |
| WO | WO 98/12761 | 3/1998 |

OTHER PUBLICATIONS

Delmas et al., "The Nasicon Type Titanium Phosphates . . . ", Solid State Ionics, vol. 28–30, pp 419–423, Sep. 1988.*

Okada et al., Proc. 36th Power Sources Conf. at Cherry Hill, New Jersey, Jun. 1994.*

(List continued on next page.)

*Primary Examiner*—Carol Chaney
(74) *Attorney, Agent, or Firm*—Katten Muchin Zavis

(57) ABSTRACT

The invention relates to materials for use as electrodes in an alkali-ion secondary (rechargeable) battery, particularly a lithium-ion battery. The invention provides transition-metal compounds having the ordered-olivine or the rhombohedral NASICON structure and the polyanion $(PO_4)^{3-}$ as at least one constituent for use as electrode material for alkali-ion rechargeable batteries.

3 Claims, 9 Drawing Sheets

OTHER PUBLICATIONS

Bykov et al., "Superionic Conductors . . . ", Solid State Ionics, vol. 28, pp. 31–52, Apr. 1990.*

Delmas and Nadiri, *Mater. Res. Bull.*, 23, 65 (1988).

Goodenough, Hong, Kafalas, *Mater. Res. Bull.* 11, 203 (1976).

Guyomard and Tarascon, *J. Electrochem. Soc.*, 139, 937 (1992).

Long, Longworth, Battle, Cheetham, Thundathil, Beveridge, *Inorg. Chem.*, 18, 624 (1979).

Manthiram and Goodenough. *J. Power Sources*, 26, 403 (1989).

Masquelier, Tabuchi, Ado, Kanno. Kobayashi, Nakamura, Goodenough, *J. Solid State Chem.*, 123, 255 (1996).

Mizushima, Jones, Wiseman, Goodenough, *Mater, Res. Bull.*, 15, 783 (1980).

Nanjundaswamy, Padhi, Goodenough, Okada, Ohtsuka, Arai, Yamaki, *Solid State Ionics*, 92, 1 (1996).

Okada, Nanjundaswamy, Manthiram, Goodenough, *Proc. 36th Power Sources Conf.*, at Cherry Hill, New Jersey (Jun. 6–9, 1994).

Schöllhorn and Payer, *Agnew. Chem. (Int. Ed. Engl.)*, 24, 67 (1985).

Sinha and Murphy, *Solid State Ionics*, 20, 81 (1986).

Thackeray, David, Goodenough, Groves, *Mater. Res. Bull.*, 20, 1137 (1983).

Thackeray, Johnson, de Piciotto, Bruce, Goodenough, *Mater. Res. Bull.*, 19, 179 (1984).

Thackeray, David, Bruce, Goodenough, *Mater. Res. Bull.* 18, 461 (1983).

Wang and Hwu, *Chem. of Mater.* 4, 589 (1992).

International Search Report dated Aug. 29, 1997.

Masquelier et al., "New Cathode materials for rechargeable lithium batteries: the 3-D framework structures $Li_3Fe_2(XO_4)(X=P,As)$," *J. of Solid State Chemistry*, 135:228–234, 1998.

Padhi et al., "Effect of structure on the $Fe^{3+}/Fe^{2+}$ redox couple in iron phosphates," *J. of the Electrochem. Society*, 144:1609–1613, 1997.

Padhi et al., "Mapping of transition metal redox energies in phosphates with NASICON structure by lithium intercalation," *J. Electrochem. Soc.*, 144:2581–2586, 1997.

Padhi et al., "Phospho–olivines as positive–electrode materials for rechargeable lithium batteries," *J. Electrochem. Soc.*, 144: 1188–1194, 1997.

Padhi et al., "Tuning the position of the redox couples in materials with NASICON structure by anionic substitution," *J. Electrochem. Soc.*, 145:1518–1520, 1998.

Piffard et al., "Beta Zr2(P04)2(S04) . . . " J. Solid State Chem. (1987) 71(1), 121–30.*

Phase Transitions and Ionic Conduction in 3D Skeleton Phosphates, F. d'Yvoire et al., Solid State Ionics, 1983, pp. 851–858 no month.

Superionic Conductors $Li_3M_2(PO_4)_3$ (M'Fe, Sc, Cr): Synthesis, Structure and Electrophysical Properties, Bykov et al., Solid State Ionics, vol. 38 No. 1, pp. 31–52 no month.

Lithium Ion Conductors Based on $LiTi_2P_3O_{12}$ Compound, Zu–Xiang Lin et al., Solid State Ionics. vol. 31, No. 2 pp. 91–94 no month.

Ionic Conductivity of the Lithium Titanium Phosphate (Li+ XMXTi2–X(PO4)2, M=AL, SC, Y and LA) Systems, Hiromichi Aono et al., Journal of the Electrochemical Society, vol. 136, No. 2, p. 590–591 no month.

Lithium Ion conductors in the System AB(IV)2(PO4)3 (B=Ti, Zr, and Hf), Subramanian M A et al. Solid State Ionics, vol. 18–19, pp. 562–569 no month.

* cited by examiner

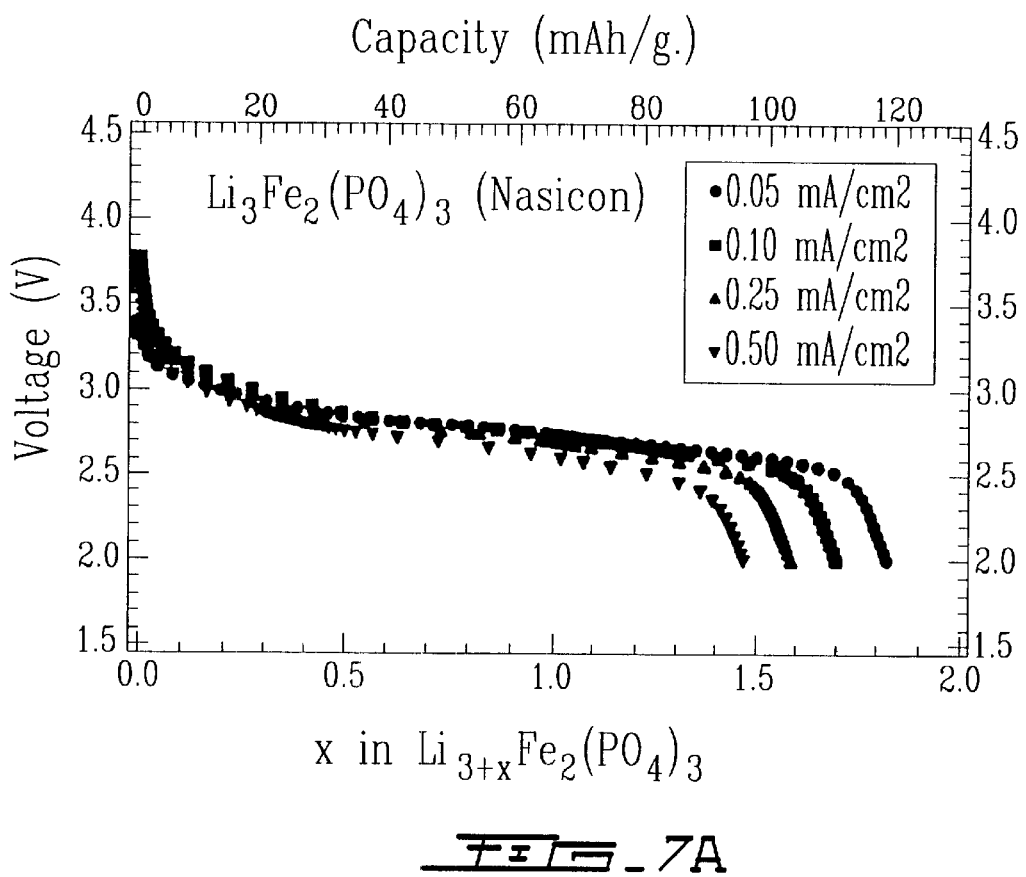
FIG_7A
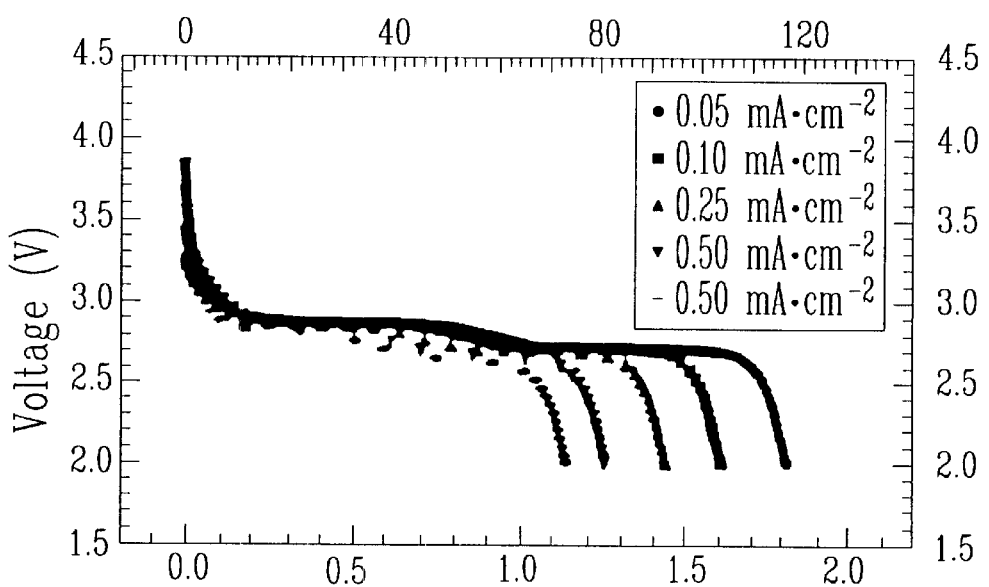
FIG_7B

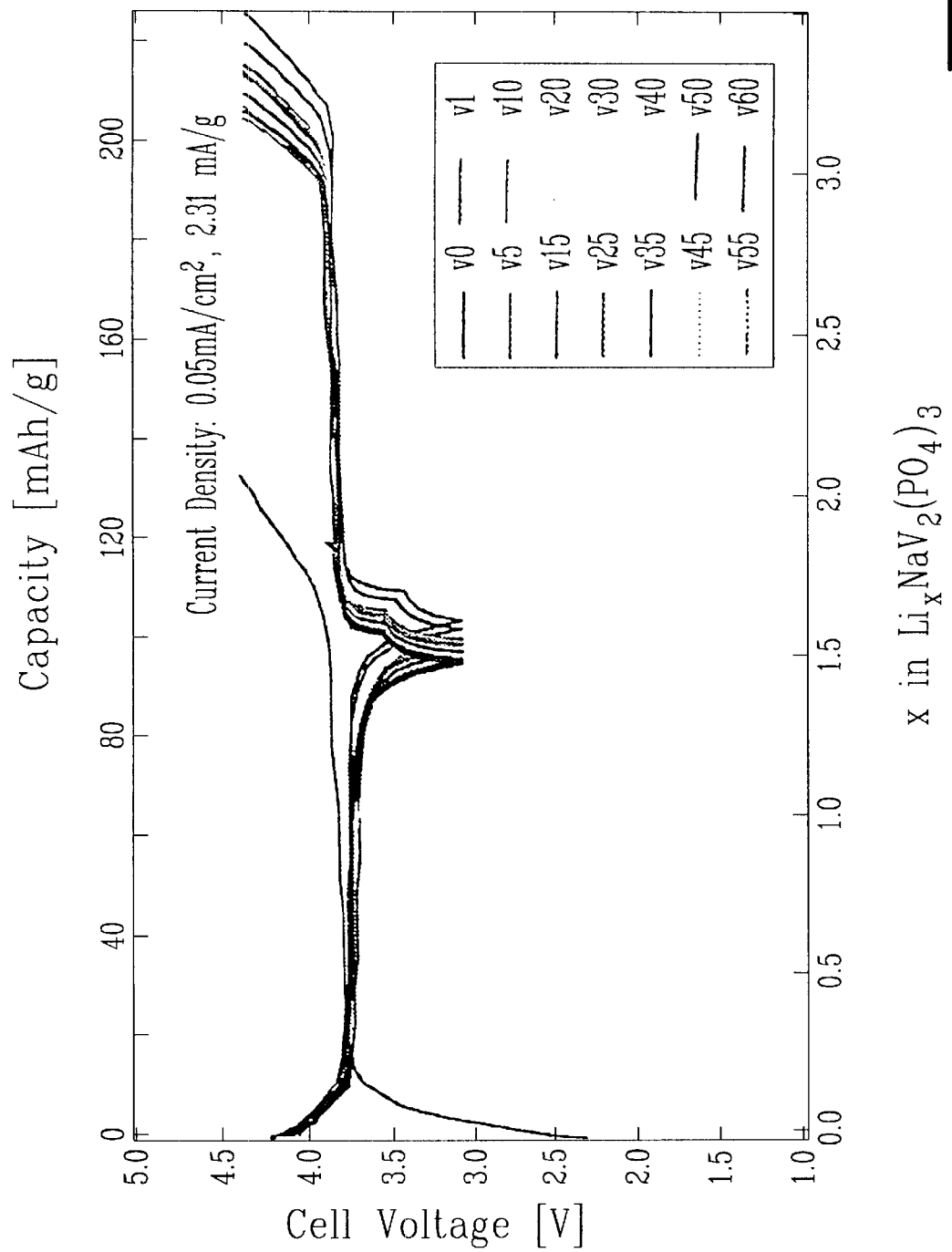

CATHODE MATERIALS FOR SECONDARY (RECHARGEABLE) LITHIUM BATTERIES

This is a divisional of application Serial No. 08/840,523, filed Apr. 21, 1997, which is a non-provisional application of provisional application Serial Nos. 60/032,346, filed Dec. 4, 1996, and 60/016,060, filed Apr. 23, 1996 and now U.S. Pat. No. 5,910,382.

BACKGROUND OF THE INVENTION

1. Field of the Invention

The present invention relates to secondary (rechargeable) alkali-ion batteries. More specifically, the invention relates to materials for use as electrodes for an alkali-ion battery. The invention provides transition-metal compounds having the ordered olivine or the rhombohedral NASICON structure and containing the polyanion $(PO_4)^{3-}$ as at least one constituent for use as electrode material for alkali-ion rechargeable batteries.

2. Description of the Related Art

Present-day lithium batteries use a solid reductant as the anode and a solid oxidant as the cathode. On discharge, the metallic anode supplies $Li^+$ ions to the $Li^+$-ion electrolyte and electrons to the external circuit. The cathode is typically an electronically conducting host into which $Li^+$ ions are inserted reversibly from the electrolyte as a guest species and charge-compensated by electrons from the external circuit. The chemical reactions at the anode and cathode of a lithium secondary battery Must be reversible. On charge, removal of electrons from the cathode by an external field releases $Li^+$ ions back to the electrolyte to restore the parent host structure, and the addition of electrons to the anode by the external field attracts charge-compensating $Li^+$ ions back into the anode to restore it to its original composition.

Present-day rechargeable lithium-ion batteries use a coke material into which lithium is inserted reversibly as the anode and a layered or framework transition-metal oxide is used as the cathode host material (Nishi et al., U.S. Pat. No. 4,959,281). Layered oxides using Co and/or Ni are expensive and may degrade due to the incorporation of unwanted species from the electrolyte. Oxides such as $Li_{1+x}[Mn_2]O_4$, which has the $[M_2]O_4$ spinel framework, provide strong bonding in three dimensions and an interconnected interstitial space for lithium insertion. However, the small size of the $O^{2-}$ ion restricts the free volume available to the $Li^-$ ions, which limits the power capability of the electrodes. Although substitution of a larger $S^{2-}$ ion for the $O^{2-}$ ion increases the free volume available to the $Li^+$ ions, it also reduces the output voltage of an elementary cell.

A host material that will provide a larger free volume for $Li^+$-ion motion in the interstitial space would allow realization of a higher lithium-ion conductivity $\sigma_{Li}$, and hence higher power densities. An oxide is needed for output voltage, and hence higher energy density. An inexpensive, non-polluting transition-metal atom would make the battery environmentally benign.

SUMMARY OF THE INVENTION

The present invention meets these goals more adequately than previously known secondary battery cathode materials by providing oxides containing larger tetrahedral is oxide polyanions forming 3D framework host structures with octahedral-site transition-metal oxidant cations, such as iron, that are environmentally benign.

The present invention provides electrode material for a rechargeable electrochemical cell comprising an anode, a cathode and an electrolyte. The cell may additionally include an electrode separator. As used herein, "electrochemical cell" refers not only to the building block, or internal portion, of a battery but is also meant to refer to a battery in general. Although either the cathode or the anode may comprise the material of the invention, the material will preferably be useful in the cathode.

Generally, in one aspect, the invention provides an ordered olivine compound having the general formula $LiMPO_4$, where M is at least one first row transition-metal cation. The alkali ion $Li^+$ may be inserted/extracted reversibly from/to the electrolyte of the battery to/from the interstitial space of the host $MPO_4$ framework of the ordered-olivine structure as the transition-metal M cation (or combination of cations) is reduced/oxidized by charge-compensating electrons supplied/removed by the external circuit of the battery in, for a cathode material, a discharge/charge cycle. In particular, M will preferably be Mn, Fe, Co, Ti, Ni or a combination thereof Examples of combinations of the transition-metals for use as the substituent M include, but are not limited to, $Fe_{1-x}Mn_x$, and $Fe_{1-x}Ti_x$, where 0<x<1.

Preferred formulas for the ordered olivine electrode compounds of the invention include, but are not limited to $LiFePO_4$, $LiMnPO_4$, $LiCoPO_4$, $LiNiPO_4$, and mixed transition-metal compounds such as $Li_{1-2x}Fe_{1-x}Ti_xPO_4$ or $LiFe_{1-x}Mn_xPO_4$, where 0<x<1. However, it will be understood by one of skill in the art that other compounds having the general formula $LiMPO_4$ and an ordered olivine structure are included within the scope of the invention.

The electrode materials of the general formula $LiMPO_4$ described herein typically have an ordered olivine structure having a plurality of planes defined by zigzag chains and linear chains, where the M atoms occupy the zigzag chains of octahedra and the Li atoms occupy the linear chains of alternate planes of octahedral sites.

In another aspect, the invention provides electrode materials for a rechargeable electrochemical cell comprising an anode, a cathode and an electrolyte, with or without an electrode separator, where the electrode materials comprise a rhombohedral NASICON material having the formula $Y_xM_2(PO_4)_3$, where $0 \leq x \leq 5$. Preferably, the compounds of the invention will be useful as the cathode of a rechargeable electrochemical cell. The alkali ion Y may be inserted from the electrolyte of the battery to the interstitial space of the rhombohedral $M_2(XO_4)_3$ NASICON host framework as the transition-metal M cation (or combination of cations) is reduced by charge-compensating electrons supplied by the external circuit of the battery during discharge with the reverse process occurring during charge of the battery. While it is contemplated that the materials of the invention may consist of either a single rhombohedral phase or two phases, e.g. orthorhombic and monoclinic, the materials are preferably single-phase rhombohedral NASICON compounds. Generally, M will be at least one first-row transition-metal cation and Y will be Li or Na. In preferred compounds, M will be Fe, V, Mn, or Ti and Y will be Li.

Redox energies of the host M cations can be varied by a suitable choice of the $XO_4$ polyanion, where X is taken from Si, P, As, or S and the structure may contain a combination of such polvanions. Tuning of the redox energies allows optimization of the battery voltage with respect to the electrolyte used in the battery. The invention replaces the oxide ion $O^{2-}$ of conventional cathode materials by a polyanion $(XO_4)^{m-}$ to take advantage of (1) the larger size of the polyanion, which can enlarge the free volume of the host interstitial space available to the alkali ions, and (2) the covalent X—O bonding, which stabilizes the redox energies of the M cations with M-O-X bonding so as to create acceptable open-circuit voltages $V_{oc}$ with environmentally benign $Fe^{3+}/Fe^{2+}$ and/or $Ti^{4+}/Ti^{3+}$ or $V^{4+}/V^{3+}$ redox couples.

Preferred formulas for the rhombohedral NASICON electrode compounds of the invention include, but are not limited to those having the formula $Li_{3+x}Fe_2(PO_4)_3$, $Li_{2+x}FeTi(PO_4)_3$, $Li_xTiNb(PO_4)_3$, and $Li_{1+x}FeNb(PO_4)_3$, where $0<x<2$. It will be understood by one of skill in the art that Na may be substituted for Li in any of the above compounds to provide cathode materials for a Na rechargeable battery. For example, one may employ $Na_{3+x}Fe_2(PO_4)_3$, $Na_{2+x}FeTi(PO_4)_3$, $Na_xTiNb(PO_4)_3$ or $Na_{1+x}FeNb(PO_4)_3$, where $0<x<2$, in a Na ion rechargeable battery. In this aspect, $Na^+$ is the working ion and the anode and electrolyte comprise a Na compound.

Compounds of the invention having the rhombohedral NASICON structure form a framework of $MO_6$ octahedra sharing all of their corners with $XO_4$ tetrahedra (X=Si, P, As, or S), the $XO_4$ tetrahedra sharing all of their corners with octahedra. Pairs of $MO_6$ octahedra have faces bridged by three $XO_4$ tetrahedra to form "lantern" units aligned parallel to the hexagonal c-axis (the rhomobhedral [111] direction), each of these $XO_4$ tetrahedra bridging to two different "lantern" units. The $Li^+$ or $Na^+$ ions occupy the interstitial space within the $M_2(XO_4)_3$ framework. Generally, $Y_xM_2(XO_4)_3$ compounds with the rhombohedral NASICON framework may be prepared by solid-state reaction of stoichiometric proportions of the Y, M, and $XO_4$ groups for the desired valence of the M cation. Where Y is Li, the compounds may be prepared indirectly from the Na analog by ion exchange of $Li^+$ for $Na^+$ ions in a molten $LiNO_3$ bath at 300° C. For example. rhombohedral $LiTi_2(PO_4)_3$ may be prepared from intimate mixtures of $Li_2CO_3$ or $LiOH·H_2O$, $TiO_2$, and $NH_4H_2PO_4·H_2O$ calcined in air at 200° C. to eliminate $H_2O$ and $CO_2$ followed by heating in air for 24 hours near 850° C. and a further heating for 24 hours near 950° C. However, preparation of $Li_3Fe_2(PO_4)_3$, by a similar solid-state reaction gives the undesired monoclinic framework. To obtain the rhombohedral form, it is necessary to prepare rhombohedral $Na_3Fe_2(PO_4)_3$ by solid-state reaction of $NaCO_3$, $Fe\{CH_2COOH\}_2$ and $NH_4H_2PO_4·H_2O$, for example. The rhombohedral form of $Li_3Fe_2(PO_4)_3$ is then obtained at 300° C. by ion exchange of $Li^+$ for $Na^+$ in a bath of molten $LiNO_3$. It will be understood by one of skill in the art that the rhombohedral Na compounds will be useful as cathode materials in rechargeable Na ion batteries.

In another aspect of the invention, the rhombohedral NASICON electrode compounds may have the general formula $Y_xM_2(PO_4)_y(XO_4)_{3-y}$, where $0<y\leq3$, M is a transition-metal atom, Y is Li or Na, and X=Si, As, or S and acts as a counter cation in the rhombohedral NASICON framework structure. In this aspect, the compound comprises a phosphate anion as at least part of an electrode material. In preferred embodiments, the compounds are used in the cathode of a rechargeable battery. Preferred compounds having this general formula include, but are not limited to $Li_{1+x}Fe_2(SO_4)_2(PO_4)$, where $0\leq x\leq1$.

The rhombohedral NASICON compounds described above may typically be prepared by preparing an aqueous solution comprising a lithium compound, an iron compound, a phosphate compound and a sulfate compound, evaporating the solution to obtain dry material and heating the dry material to about 500° C. Preferably, the aqueous starting solution comprises $FeCl_3$, $(NH_4)_2SO_4$, and $LiH_2PO_4$.

In a further embodiment, the invention provides electrode materials for a rechargeable electrochemical cell comprising an anode, a cathode and an electrolyte, with or without an electrode separator, where the electrode materials have a rhombohedral NASICON structure with the general formula $A_{3-x}V_2(PO_4)_3$. In these compounds, A may be Li, Na or a combination thereof and $0\leq x\leq2$. In preferred embodiments, the compounds are a single-phase rhombohedral NASICON material. Preferred formulas for the rhombohedral NASICON electrode compounds having the general formula $A_{3-x}V_2(PO_4)_3$ include, but are not limited to those having the formula $Li_{2-x}NaV_2(PO_4)_3$, where $0\leq x\leq2$.

The rhombohedral NASICON materials of the general formula $A_{3-x}V_2(PO_4)_3$ may generally be prepared by the process outlined in FIG. 9. Alternatively, $Li_2NaV_2(PO_4)_3$ may be prepared by a direct solid-state reaction from $LiCO_3$, $NaCO_3$, $NH_4H_2PO_4·H_2O$ and $V_2O_3$.

In a further aspect, the invention provides a secondary (rechargeable) battery where an electrochemical cell comprises two electrodes and an electrolyte, with or without an electrode separator. The electrodes are generally referred to as the anode and the cathode. The secondary batteries of the invention generally comprise as electrode material, and preferably as cathode material, the compounds described above. More particularly, the batteries of the invention have a cathode comprising the ordered olivine compounds described above or the rhombohedral NASICON compounds described above.

BRIEF DESCRIPTION OF THE DRAWINGS

The following drawings form part of the present specification and are included to demonstrate further certain aspects of the present invention. The invention may be better understood by reference to one or more of these drawings in combination with the detailed description of specific embodiments presented herein.

FIG. 1 shows a typical polarization curve for the battery voltage V vs. the/delivered across a load. The voltage drop $(V_{oc}-V)\equiv\eta(I)$ of a typical curve is a measure of the battery resistance $R_b(I)$. The interfacial voltage drops saturate in region (i). The slope of the curve in region (ii) is $dV/dI\approx R_{el}+R_c(A)+R_c(C)$, the sums of the electrolyte resistance $R_{el}$ and the current-collector resistances at the anode and cathode. Region (iii) is diffusion-limited. At the higher currents I, normal processes do not bring ions to or remove them from the electrode/electrolyte interfaces rapidly enough to sustain an equilibrium reaction.

FIG. 2A shows discharge/charge curves at 0.05 mA·cm$^{-2}$ (0.95 mA·g$^{-1}$) for the olivine $Li_{1-x}FePO_4$ as cathode and lithium as anode. A plateau at 3.4V corresponds to the $Fe^{3+}/Fe^{2+}$ redox couple relative to the lithium anode. A plateau at 4.1 V corresponds to the $Mn^{3+}/Mn^{2+}$ couple. FIG. 2B shows discharge/charge curves at 0.05 mA·cm$^{-2}$ (1.13 mA·g$^{-1}$) for the olivine $Li_{1-x}Fe_{0.5}Mn_{0.5}PO_4$ as cathode relative to a lithium anode. FIG. 2C shows discharge/charge curves vs. lithium at 0.05 mA·cm$^{-2}$ (0.95 mA·g$^{-1}$) for the olivine $Li_xFePO_4$.

FIG. 3 shows discharge/charge curves of an $FePO_4/LiClO_4+PC+DME/Li$ coin cell at 185 mA·g$^{-1}$ for $FePO_4$ prepared by chemical extraction of Li (delithiation) from $LiFePO_4$.

FIG. 5A shows the rhombohedral R3c (NASICON) framework structure of $Li_3Fe_2(PO_4)_3$ prepared by ion exchange from $Na_3Fe_2(PO_4)_3$; FIG. 5B shows the monoclinic $P2_1/n$ framework structure of $Li_3Fe_2(PO_4)_3$ prepared by solid-state reaction. The large, open three-dimensional framework of $FeO_6$ octahedra and $PO_4$ tetrahedra allows an easy diffusion of the lithium ions.

FIG. 6A shows discharge/charge curves vs. lithium at 0.1 mA·cm$^{-2}$ for rhombohedral $Li_{3+x}Fe_2(PO_4)_3$ where 0<x<2. The shape of the curve for lithium insertion into rhombohedral $Li_{3+x}Fe_2(PO_4)_3$ is surprisingly different from that for the monoclinic form. However, the average $V_{oc}$ at 2.8 V remains the same. The Li$^+$-ion distribution in the interstitial space appears to vary continuously with x with a high degree of disorder. FIG. 6B shows discharge/charge curves vs. lithium at 0.1 mA·cm$^{-2}$ for monoclinic $Li_{3+x}Fe_2(PO_4)_3$ where 0<x<2.

FIGS. 7A and 7B. FIG. 7A shows discharge curves vs. a lithium anode at current densities of 0.05–0.5 mA·cm$^{-2}$ for rhombohedral $Li_{3+x}Fe_2(PO_4)_3$. A reversible capacity loss on increasing the current density from 0.05 to 0.5 mA·cm$^{-2}$ is shown. This loss is much reduced compared to what is encountered with the monoclinic system. FIG. 7B shows discharge curves at current densities of 0.05–0.5 mA·cm$^{-2}$ for monoclinic $Li_{3+x}Fe_2(PO_4)_3$.

FIG. 8. FIG. 8 shows discharge/charge curves at 0.05 mA·cm$^{-2}$ (0.95 mA·g$^{-1}$) for the rhombohedral $Li_xNaV_2(PO_4)_3$. Rhombohedral $Li_2NaV_2(PO_4)_3$ reversibly intercalates 1.5 Li per formula unit for a discharge capacity of 100 mAh·g$^{-1}$ with average closed-circuit voltage of 3.8 V vs. a lithium anode.

FIG. 9 illustrates the solid-state synthesis of $Li_2NaV_2(PO_4)_3$ having the rhombohedral NASICON framework.

DESCRIPTION OF ILLUSTRATIVE EMBODIMENTS

Figure 1:
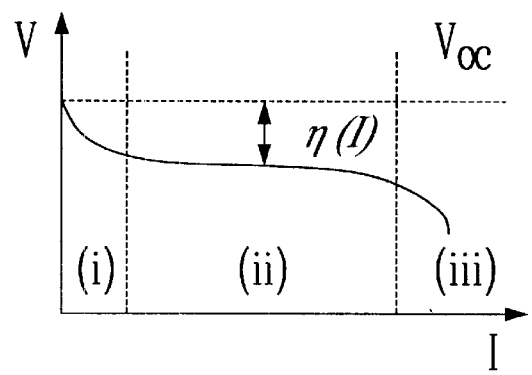
FIG. 1.

Present-day secondary (rechargeable) lithium batteries use a solid reductant as the anode and a solid oxidant as the cathode. It is important that the chemical reactions at the anode and cathode of a lithium secondary battery be reversible. On discharge, the metallic anode supplies Li$^+$-ions to the Li$^+$-ion electrolyte and electrons to the external circuit. The cathode is a host compound into/from which the working Li$^+$ ion of the electrolyte can be inserted/extracted reversibly as a guest species over a large solid-solubility range (Goodenough 1994). When the Li$^+$ ions are inserted as a guest species into the cathode, they are charge-compensated by electrons from the external circuit. On charge, the removal of electrons from the cathode by an external field releases Li$^+$ ions back to the electrolyte to restore the parent host structure. The resultant addition of electrons to the anode by the external field attracts charge-compensating Li$^+$ ions back into the anode to restore it to its original composition.

The present invention provides new materials for use as cathodes in lithium secondary (rechargeable) batteries. It will be understood that the anode for use with the cathode material of the invention may be any lithium anode material, such as a reductant host for lithium or elemental lithium itself. Preferably, the anode material will be a reductant host for lithium. Where both the anode and cathode are hosts for the reversible insertion or removal of the working ion into/from the electrolyte, the electrochemical cell is commonly called a "rocking-chair" cell. An implicit additional requirement of a secondary battery is maintenance not only of the electrode/electrolyte interfaces, but also of electrical contact between host particles, throughout repeated discharge/recharge cycles.

Since the volumes of the electrode particles change as a result of the transfer of atoms from one to another electrode in a reaction, this requirement normally excludes the use of a crystalline or glassy electrolyte with a solid electrode. A non-aqueous liquid or polymer electrolyte having a large energy-gap window between its highest occupied molecular orbital (HOMO) and its lowest unoccupied molecular orbital (LUMO) is used with secondary lithium batteries in order to realize higher voltages. For example, practical quantities of very ionic lithium salts such as $LiClO_4$, $LiBF_4$ and $LiPF_6$ can be dissolved in empirically optimized mixtures of propylene carbonate (PC), ethylene carbonate (EC), or dimethyl carbonate (DMC) to provide acceptable electrolytes for use with the cathodes of the invention. It will be recognized by those of skill in the art that the $(ClO_4)^-$ anion is explosive and not typically suitable for commercial applications.

General Design Considerations

The power output P of a battery is the product of the electric current I delivered by the battery and the voltage V across the negative and positive posts (equation 1).

$$P=IV \quad (1)$$

The voltage V is reduced from its open-circuit value $V_{oc}$ (I=0) by the voltage drop $IR_b$ due to the internal resistance $R_b$ of the battery (equation 2).

$$V=V_{oc}-IR_b \quad (2)$$

The open-circuit value of the voltage is governed by equation 3.

$$V_{oc}=(\mu_A-\mu_C)/(-nF)<5V \quad (3)$$

In equation 3, n is the number of electronic charges carried by the working ion and F is Faraday's constant. The magnitude of the open-circuit voltage is constrained to $V_{oc}<5V$ not only by the attainable difference $\mu_A-\mu_C$ of the electrochemical potentials of the anode reductant and the cathode oxidant but also by the energy gap $E_g$ between the HOMO (highest occupied molecular orbital) and the LUMO (lowest unoccupied molecular orbital) of a liquid electrolyte or by the energy gap $E_g$ between the top of the valence band and the bottom of the conduction band of a solid electrolyte.

The chemical potential $\mu_A$, which is the Fermi energy $\epsilon_F$ of a metallic-reductant anode or the HOMO of a gaseous or liquid reductant, must lie below the LUMO of a liquid electrolyte or the conduction band of a solid electrolyte to achieve thermodynamic stability against reduction of the electrolyte by the reductant. Similarly, the chemical potential $\mu_C$, which is the LUMO of a gaseous or liquid oxidant or the Fermi energy of a metallic-oxidant cathode, must lie above the HOMO of a liquid electrolyte or the valence band of a solid electrolyte to achieve thermodynamic stability against oxidation of the electrolyte by the oxidant. Thermodynamic stability thus introduces the constraint $$\mu_A-\mu_C \leq E_g \quad (4)$$

as well as the need to match the "window" $E_g$ of the electrolyte to the energies $\mu_A$ and $\mu_C$ of the reactants to maximize $V_{oc}$. It follows from equations 1 and 2 that realization of a high maximum power $P_{max}$ (equation 5) requires, in addition to as high a $V_{oc}$ as possible, a low internal battery resistance $R_b$ (see equation 6).

$$P_{max} = I_{max} V_{max} \tag{5}$$

$$R_b = R_{el} + R_{in}(A) + R_{in}(C) + R_c(A) + R_c(C) \tag{6}$$

The electrolyte resistance $R_{el}$ to the ionic current is proportional to the ratio of the effective thickness L to the geometrical area A of the interelectrode space that is filled with an electrolyte of ionic conductivity $\sigma_i$ (equation 7).

$$R_{el} = (L/\sigma_p A) \tag{7}$$

Since ions move diffusively, $\sigma_i$ (see equation 8) increases with temperature. A $\sigma_i \leq 0.1$ Scm$^{-1}$ (the maximum $\sigma_i$ represents the room-temperature protonic conductivity $\sigma_{Li}$ in a strong acid) at an operating temperature $T_{op}$ dictates the use of a membrane separator of large geometrical area A and small thickness L.

$$\sigma_{Li} = (B/T) \exp(-\varepsilon_a/kT) \tag{8}$$

The resistance to transport of the working ion across the electrolyte-electrode interfaces is proportional to the ratio of the geometrical and interfacial areas at each electrode:

$$R_{in} \sim A/A_{in} \tag{9}$$

where the chemical reaction of the cell involves ionic transport across an interface, equation 9 dictates construction of a porous, small-particle electrode. Achievement and retention of a high electrode capacity, i.e., utilization of a high fraction of the electrode material in the reversible reaction, requires the achievement and retention of good electronic contact between particles as well as a large particle-electrolyte interface area over many discharge/charge cycles. If the reversible reaction involves a first-order phase change, the particles may fracture or lose contact with one another on cycling to break a continuous electronic pathway to the current collector.

Loss of interparticle electrical contact results in an irreversible loss of capacity. There may also be a reversible capacity fade. Where there is a two-phase process (or even a sharp guest-species gradient at a diffusion front) without fracture of the particles, the area of the interface (or diffusion front) decreases as the second phase penetrates the electrode particle. At a critical interface area, diffusion across the interface may not be fast enough to sustain the current I, so not all of the particle is accessible. The volume of inaccessible electrode increases with I, which leads to a diffusion-limited reversible canacity fade that increases with I. This problem becomes more important at lower ionic conductivity $\sigma_{Li}$.

The battery voltage V vs. the current I delivered across a load is called the polarization curve. The voltage drop $(V_{oc} - V) \equiv \eta(I)$ of a typical curve, FIG. 1, is a measure of the battery resistance (see equation 10).

$$R_b(I) = \eta(I)/I \tag{10}$$

On charging, $\eta(I) = (V_{app} - V_{oc})$ is referred to as an overvoltage. The interfacial voltage drops saturate in region (i) of FIG. 1; therefore in region (ii) the slope of the curve is $$dV/dI \approx R_{el} + R_c(A) + R_c(C) \tag{11}$$

Region (iii) is diffusion-limited; at the higher currents I, normal processes do not bring ions to or remove them from the electrode/electrolyte interfaces rapidly enough to sustain an equilibrium reaction.

The battery voltage V vs. the state of charge, or the time during which a constant current I has been delivered, is called a discharge curve.

Cathode Materials

The cathode material of the present invention, for use in a secondary lithium battery, consists of a host structure into which lithium can be inserted reversibly. The maximum power output, $P_{max}$ (see equation 5), that can be achieved by a cell depends on the open-circuit voltage $V_{oc} = \Delta E/e$ and the overvoltage $\eta(I)$ at the current $I_{max}$ of maximum power $$V_{max} = V_{oc} - \eta(I_{max}) \tag{12}$$

$\Delta E$ is the energy difference between the work function of the anode (or the HOMO of the reductant) and that of the cathode (or the LUMO of the oxidant). In order to obtain a high $V_{oc}$, it is necessary to use a cathode that is an oxide or a halide. It is preferable that the cathode be an oxide in order to achieve a large $V_{oc}$ and good electronic conductivity. To minimize $\eta(I_{max})$, the electrodes must be good electronic as well as ionic conductors and they must offer a low resistance to mass transfer across the electrode/electrolyte interface. To obtain a high $I_{max}$, it is necessary to have a large electrode/electrolyte surface area. In addition, where there is a two-phase interface within the electrode particle, the rate of mass transfer across this interface must remain large enough to sustain the current. This constraint tends to limit the electrode capacity more as the current increases.

Oxide host structures with close-packed oxygen arrays may be layered, as in $Li_{1-x}CoO_2$ (Mizushima, et al. 1980), or strongly bonded in three dimensions (3D) as in the manganese spinels $Li_{1-x}[Mn_2]O_4$ (Thackeray 1995; Thackeray et al. 1983; Thackeray et al. 1984; Guyomard and Tarascon 1992; and Masquelier et al. 1996). Li intercalation into a van der Waals gap between strongly bonded layers may be fast, but it can also be accompanied by unwanted species from a liquid electrolyte. On the other hand, strong 3D bonding within a close-packed oxygen array, as occurs in the spinel framework $[Mn_2]O_4$, offers too small a free volume for the guest $Li^+$ ions to have a high mobility at room temperature, which limits $I_{max}$. Although this constraint in volume of the interstitial space makes the spinel structure selective for insertion of $Li^+$ ions, it reduces the $Li^+$-ion mobility and hence $Li^+$-ion conductivity $\sigma_{Li}$. The oxospinels have a sufficiently high $\sigma_{Li}$ to be used commercially in low-power cells (Thackeray et al., 1983) but would not be acceptable for the high power cells of the insertion.

The present invention overcomes these drawbacks by providing cathode materials containing larger tetrahedral polyanions which form 3D framework host structures with octahedral-site transition-metal oxidant cations. In the cathode materials of the invention having the NASICON structure, the transition-metal ions are separated by the polyanions, so the electronic conductivity is polaronic rather than metallic. Nevertheless, the gain in $\sigma_{Li}$ more than offsets the loss in electronic conductivity.

Variation of the energy of a given cation redox couple from one compound to another depends on two factors: (a) the magnitude of the crystalline electric field at the cation, which may be calculated for a purely ionic model by a Madelung summation of the Coulomb fields from the other ions present, and (b) the covalent contribution to the bonding, which may be modulated by the strength of the covalent bonding at a nearest-neighbor counter cation. The stronger is the negative Madelung potential at a cation, the higher is a given redox energy of a cation. Similarly the stronger is the covalent bonding of the electrons at a transition-metal cation, the higher is a given redox energy of that cation. The lower the redox energy of the cation host transition-metal ion, the larger is $V_{oc}$.

The redox couples of interest for a cathode are associated with antibonding states of d-orbital parentage at transition-metal cations M or 4f-orbital parentage at rare-earth cations Ln in an oxide. The stronger is the cation-anion covalent mixing, the higher is the energy of a given LUMO/HOMO redox couple. Modulation of the strength of the cation-anion covalence at a given M or Ln cation by nearest-neighbor cations that compete for the same anion valence electrons is known as the inductive effect. Changes of structure alter primarily the Madelung energy as is illustrated by raising of the redox energy within a spinel $[M_2]O_4$ framework by about 1 eV on transfer of $Li^+$ ions from tetrahedral to octahedral interstitial sites. Changing the counter cation, but not the structure, alters primarily the inductive effect, as is illustrated by a lowering of the $Fe^{3+}/Fe^{2+}$ redox energy by 0.6 eV on changing $(MoO_4)^{2-}$ or $(WO_4)^{2-}$ to $(SO_4)^{2-}$ polyanions in isostructural $Fe_2(XO_4)_3$ compounds. Raising the energy of a given redox couple in a cathode lowers the voltage obtained from cells utilizing a common anode. Conversely, raising the redox energy of an anode raises the cell voltage with respect to a common cathode.

The invention provides new cathode materials containing oxide polyanions, including the oxide polvanion $(PO_4)^{3-}$ as at least one constituent, for use in secondary (rechargeable) batteries. For example, the cathode materials of the present invention may have the general formula $LiM(PO_4)$ with the ordered olivine structure or the more open rhombohedral NASICON framework structure. The cathode materials of the present invention have the general formula $LiM(PO_4)$ for the ordered olivine structure, or $Y_xM_2(PO_4)_y(XO_4)_{3-y}$, where $0<y\leq 3$. M is a transition-metal atom, Y is Li or Na and X=Si, As or S and acts as a counter cation, for the rhombohedral NASICON framework structure.

The olivine structure of $Mg_2SiO_4$ consists of a slightly distorted array of oxygen atoms with $Mg^{2+}$ ions occupying half the octahedral sites in two different ways. In alternate basal planes, they form zigzag chains of corner-shared octahedra running along the c-axis and in the other basal planes they form linear chains of edge-shared octahedra running also along the c-axis.

In the ordered $LiMPO_4$ olivine structures of the invention, the M atoms occupy the zigzag chains of octahedra and the Li atoms occupy the linear chains of the alternate planes of octahedral sites. In this embodiment of the present invention, M is preferably Mn, Fe, Co, Ni or combinations thereof. Removal of all of the lithium atoms leaves the layered $FePO_4$-type structure, which has the same Pbnm orthorhombic space group. These phases may be prepared from either end, e.g., $LiFePO_4$ (triphylite) or $FePO_4$ (heterosite), by reversible extraction or insertion of lithium.

Figure 2A:
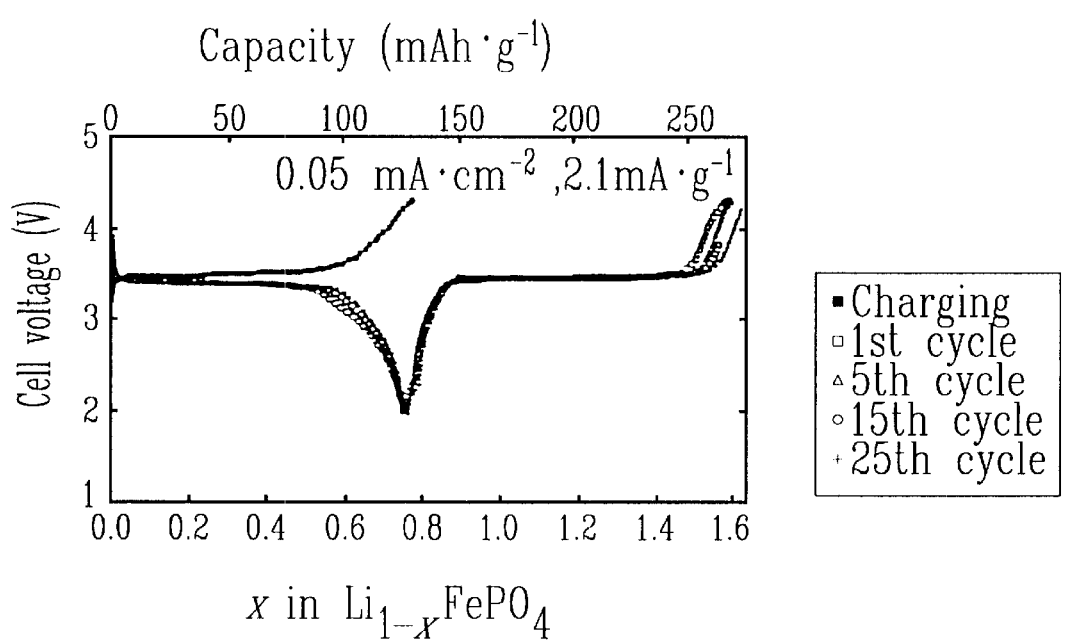
FIG. 2A, 2B and 2C.
Figure 2B:
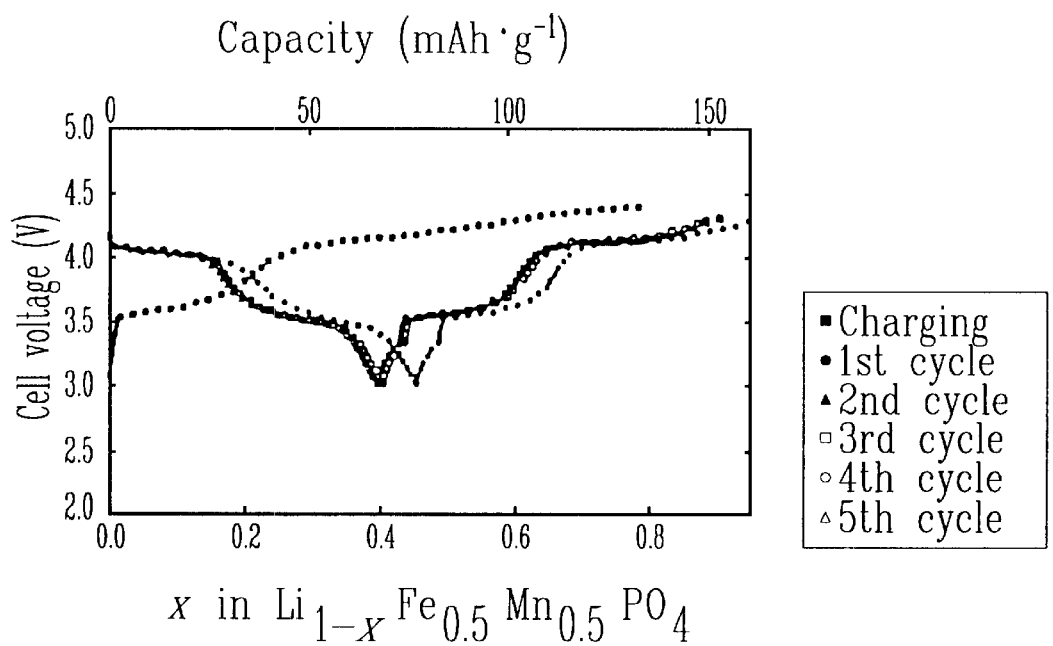
Figure 2C:
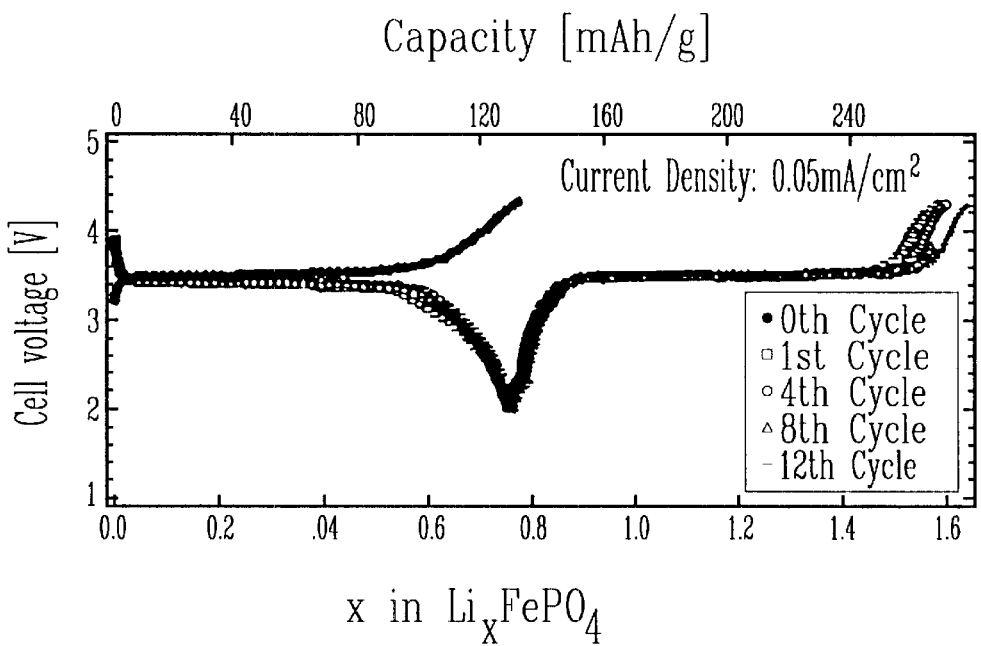

FIG. 2A, FIG. 2B and FIG. 2C show discharge/charge curves vs. lithium at 0.05 $mA\times cm^{-2}$ (0.95 $mA\times g^{-1}$ and 1.13 $mA\times g^{-1}$, respectively) for $Li_{1-x}FePO_4$, $Li_{1-x}Fe_{0.5}Mn_{0.5}PO_4$ and $Li_xFePO_4$, respectively, where $0\leq x\leq 5$. A plateau at 3.4 V corresponds to the $Fe^{3+}/Fe^{2+}$ redox couple and a plateau at 4.1 V corresponds to the $Mn^{3+}/Mn^{2+}$ couple. With $LiClO_4$ in PC and DME as the electrolyte, it is only possible to charge up a cathode to 4.3 V vs. a lithium anode, so it was not possible to extract lithium from $LiMnPO_4$, $LiCoPO_4$ and $LiNiPO_4$ with this electrolyte. However, in the presence of iron, the $Mn^{3+}/Mn^{2+}$ couple becomes accessible. The inaccessibility is due to the stability of the $Mn^{3+}/Mn^{2+}$, $Co^{3+}/Co^{2+}$ and $Ni^{3+}/Ni^{2+}$ couples in the presence of the polyanion $(PO_4)^{3-}$. The relatively strong covalence of the $PO_4$ tetrahedron of the compounds of the present invention stabilizes the redox couples at the octahedral sites to give the high $V_{oc}$'s that are observed.

Figure 3:
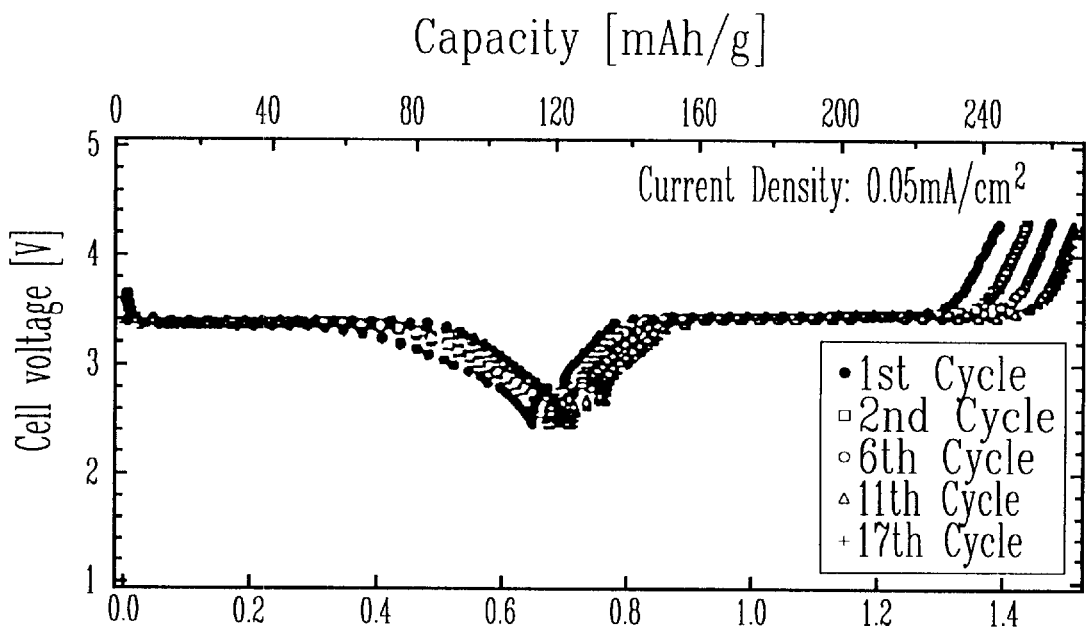
FIG. 3.

Insertion of lithium into $FePO_4$ was reversible over the several cycles studied. FIG. 3 shows discharge/charge curves of $FePO_4/LiClO_4+PC+DME/Li$ coin cell at 185 $mA\cdot g^{-1}$ for $FePO_4$ prepared by chemical extraction of Li (delithiation) from $LiFePO_4$. The $Li_xFePO_4$ material of the present invention represents a cathode of good capacity and contains inexpensive, environmentally benign elements. While a nearly close-packed-hexagonal oxide-ion array apparently provides a relatively small free volume for $Li^+$-ion motion, which would seem to support only relatively small current densities at room temperature, increasing the current density does not lower the closed-circuit voltage V. Rather, it decreases, reversibly, the cell capacity. Capacity is easily restored by reducing the current.

Figure 4:
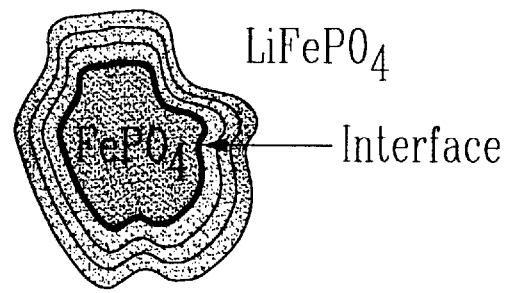
FIG. 4. Schematic representation of the motion of $LiFePO_4/FePO_4$ interface on lithium insertion in to a particle of $FePO_4$.

As illustrated schematically in FIG. 4, lithium insertion proceeds from the surface of the particle moving inwards behind a two-phase interface. In the system shown, it is a $Li_xFePO_4/Li_{1-x}FePO_4$ interface. As the lithiation proceeds, the surface area of the interface shrinks. For a constant rate of lithium transport per unit area across the interface, a critical surface area is reached where the rate of total lithium transported across the interface is no longer able to sustain the current. At this point, cell performance becomes diffusion-limited. The higher the current, the greater is the total critical interface area and, hence, the smaller the concentration x of inserted lithium before the cell performance becomes diffusion-limited. On extraction of lithium, the parent phase at the core of the particle grows back towards the particle surface. Thus, the parent phase is retained on repeated cycling and the loss in capacity is reversible on lowering the current density delivered by the cell. Therefore, this loss of capacity does not appear to be due to a breaking of the electrical contact between particles as a result of volume changes, a process that is normally irreversible.

The invention further provides new cathode materials exhibiting a rhombohedral NASICON framework. NASICON, as used herein, is an acronym for the framework host of a sodium superionic conductor $Na_{1+3x}Zr_2(P_{1-x}Si_xO_4)_3$. The compound $Fe_2(SO_4)_3$ has two forms, a rhombohedral NASICON structure and a related monoclinic form (Goodenough et al. 1976; Long et al. 1979). Each structure contains units of two $FeO_6$ octahedra bridged by three corner-sharing $SO_4$ tetrahedra. These units form 3D frameworks by the bridging $SO_4$ tetrahedra of one unit sharing corners with $FeO_6$ octahedra of neighboring $Fe_2(SO_4)_3$ elementary building blocks so that each tetrahedron shares corners with only octahedra and each octahedron with only tetrahedra. In the in rhombohedral form, the building blocks are aligned parallel; while they are aligned nearly perpendicular to one another in the monoclinic phase. The collapsed monoclinic form has a smaller free volume for $Li^+$-ion motion which is why the rhombohedral form is preferred. In these structures, the $FeO_6$ octahedra do not make direct contact, so electron transfer from an $Fe^{2+}$ to an $Fe^{3+}$ ion is polaronic and therefore activated.

$Li_xFe_2(SO_4)_3$ has been reported to be a candidate material for the cathode of a $Li^+$-ion rechargeable battery with a $V_{oc}=3.6$ V vs. a lithium anode (Manthiram and Goodenough 1989). While the sulfates would seem to provide the desired larger free volume for Li, batteries using sulfates in the cathode material tend to exhibit phase-transition problems, lowering the electronic conductivity. The reversible lithium insertion into both rhombohedral and monoclinic $Fe_2(SO_4)_3$ gives a flat closed-circuit voltage vs. a lithium anode of 3.6 V (Manthiram and Goodenough 1989; Okada et al. 1994; Nanjundaswamy et al. 1996). Neither parent phase has any significant solid solution with the orthorhombic lithiated phase $Li_2Fe_2(SO_4)_3$, which is derived from the rhombohedral form of $Fe_2(SO_4)_3$ by a displacive transition that leaves the framework intact. Powder X-ray diffraction verifies that lithiation occurs via a two-phase process (Nanjundaswamy et al. 1996). Increasing the current density does not change significantly the closed-circuit voltage V, but it does reduce reversibly the capacity. The reduction in capacity for a given current density is greater for the motion of the lithiated interface. The interstitial space of the framework allows fast $Li^+$-ion motion, but the movement of lithium across the orthorhombic/monoclinic interface is slower than that across the orthorhombic/rhombohedral interface, which makes the reversible loss of capacity with increasing current density greater for the monoclinic than for the rhombohedral parent phase.

Figure 5A:
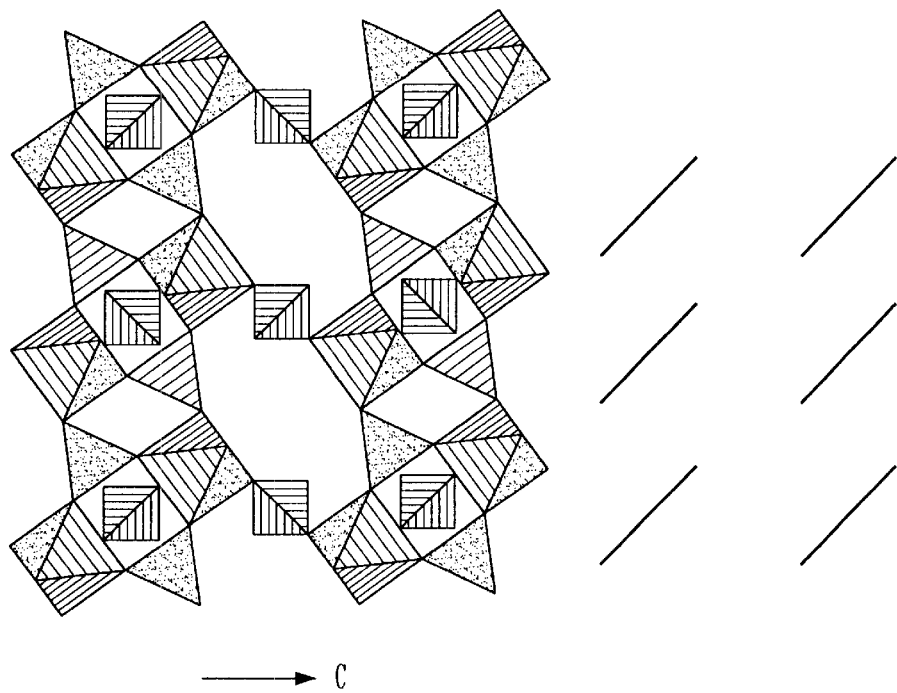
FIGS. 5A and 5B.
Figure 5B:
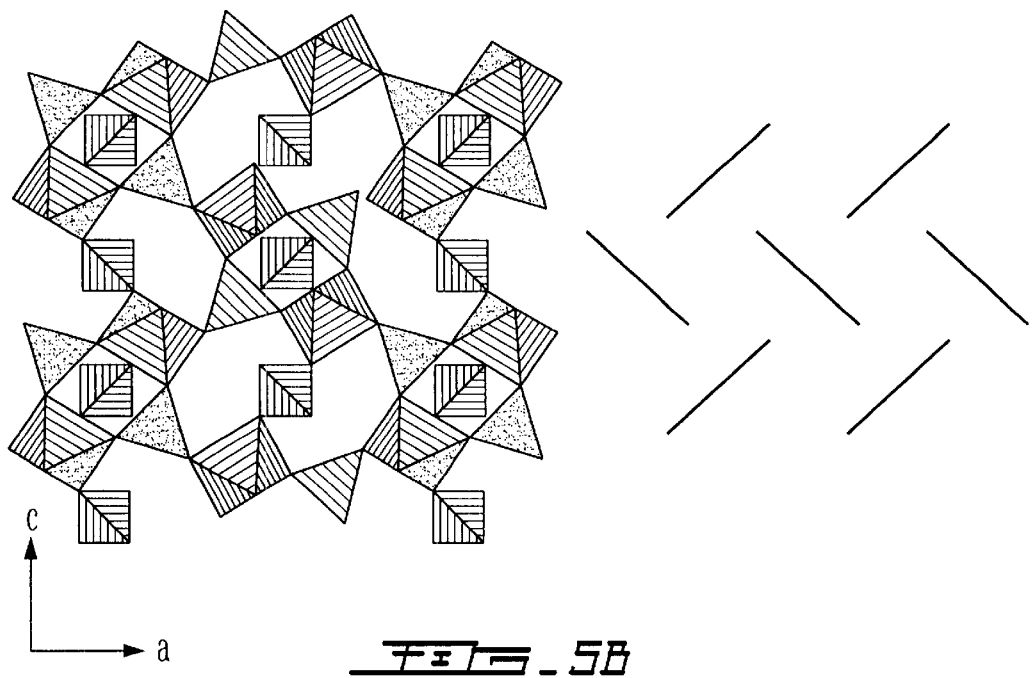

The cathode materials of the invention avoid the phase transition of known sulfate cathode materials by incorporating one or more phosphate ions as at least one of the constituents of the cathode material. The rhombohedral R3c (NASICON) and monoclinic $P2_1/n$ framework structures of $Li_3Fe_2(PO_4)_3$ are similar to those for the sulfates described above, as illustrated in FIG. 5A and FIG. 5B.

A further embodiment of the invention is a rhombohedral NASICON cathode material having the formula $A_{3-x}V_2(PO_4)_3$, where A may be Li, Na or a combination thereof. Rhombohedral $A_{3-x}V_2(PO_4)_3$ reversibly intercalates 1.5 Li per formula unit for a discharge capacity of 100 mAh·$g^{-1}$ with average closed-circuit voltage being 3.8 V vs. a lithium anode (see FIG. 8). The voltage and capacity performances of the rhombohedral $A_{3-x}V_2(PO_4)_3$ compounds of the invention are comparable to the high-voltage cathode materials $LiMn_2O_4$ (4.0 V), $LiCoO_2$ (4.0 V) and $LiNiO_2$ (4.0 V). The large, open three-dimensional framework of $VO_6$ octahedra and $PO_4$ tetrahedra allows an easy diffusion of the lithium ions, making it attractive for high-power batteries. A further advantage of this material is that it includes a cheaper and less toxic transition-metal element (V) than the already developed systems using Co, Ni, or Mn.

EXAMPLES

Example 1
Ordered Olivine $LiMPO_4$ Compounds

The ordered-olivine compound $LiFePO_4$ was prepared from intimate mixtures of stoichiometric proportions of $Li_2CO_3$ or $LiOH·H_2O$, $Fe\{CH_2COOH\}_2$ and $NH_4H_2PO_4·H_2O$; the mixtures were calcined at 300–350° C. to eliminate $NH_3$, $H_2O$, and $CO_2$ and then heated in Ar at about 800° C. for 24 hours to obtain LiFe $PO_4$. Similar solid-state reactions were used to prepare $LiMnPO_4$, $LiFe_{1-x}Mn_xPO_4$, $LiCoPO_4$ and $LiNiPO_4$. $FePO_4$ was obtained from $LiFePO_4$ by chemical extraction of Li from $LiFePO_4$. Charge/discharge curves for $Li_{1-x}FePO_4$ and discharge/charge cycles for $Li_xFePO_4$ gave similar results with a voltage of almost 3.5 V vs. lithium for a capacity of 0.6 Li/formula unit at a current density of 0.05 mA·$cm^{-2}$ (See FIG. 2A and FIG. 2C). The electrolyte used had a window restricting voltages to V<4.3 V. Li extraction was not possible from $LiMnPO_4$, $LiCoPO_4$, and $LiNiPO_4$ with the electrolyte used because these require a voltage V>4.3 V to initiate extraction. However, Li extraction from $LiFe_{1-x}Mn_xPO_4$ was performed with $0 \leq x \leq 0.5$, and the $Mn^{3+}/Mn^{2+}$ couple give a voltage plateau at 4.0 V vs. lithium.

Example 2
Rhombohedral NASICON $Li_xM_2(PO_4)_3$ Structures

The inventors compared redox energies in isostructural sulfates with phosphates to obtain the magnitude of the change due to the different inductive effects of sulfur and phosphorus. Rhombohedral $Li_{1-x}Ti_2(PO_4)_3$ has been shown to exhibit a flat open-circuit voltage $V_{oc}$=2.5 V vs. lithium, which is roughly 0.8 V below the $Ti^{4+}/Ti^{3+}$ level Sound for $FeTi(SO_4)_3$. The flat voltage V(x) is indicative of a two-phase process. A coexistence of rhombohedral and orthorhombic phases was found for x=0.5 (Delmas and Nadiri 1988 Wang and Hwu 1992). $Li_{2+x}FeTi(PO_4)_3$ of the present invention remains single phase on discharge.

Figure 6A:
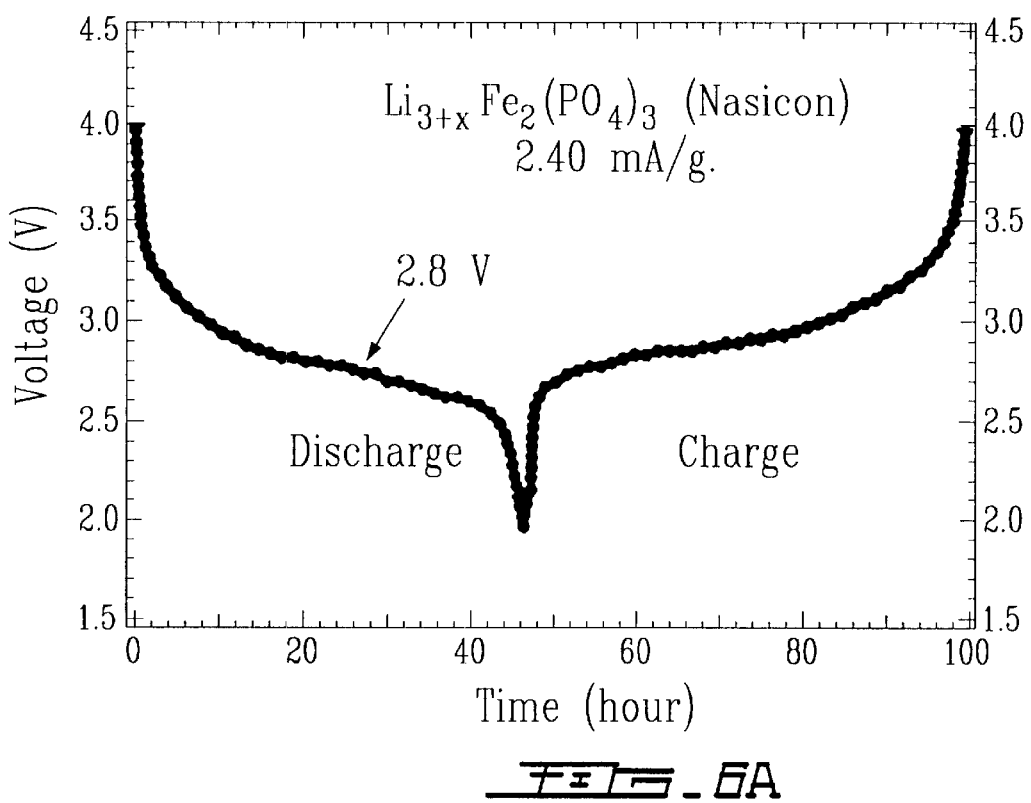
FIGS. 6A and 6B.
Figure 6B:
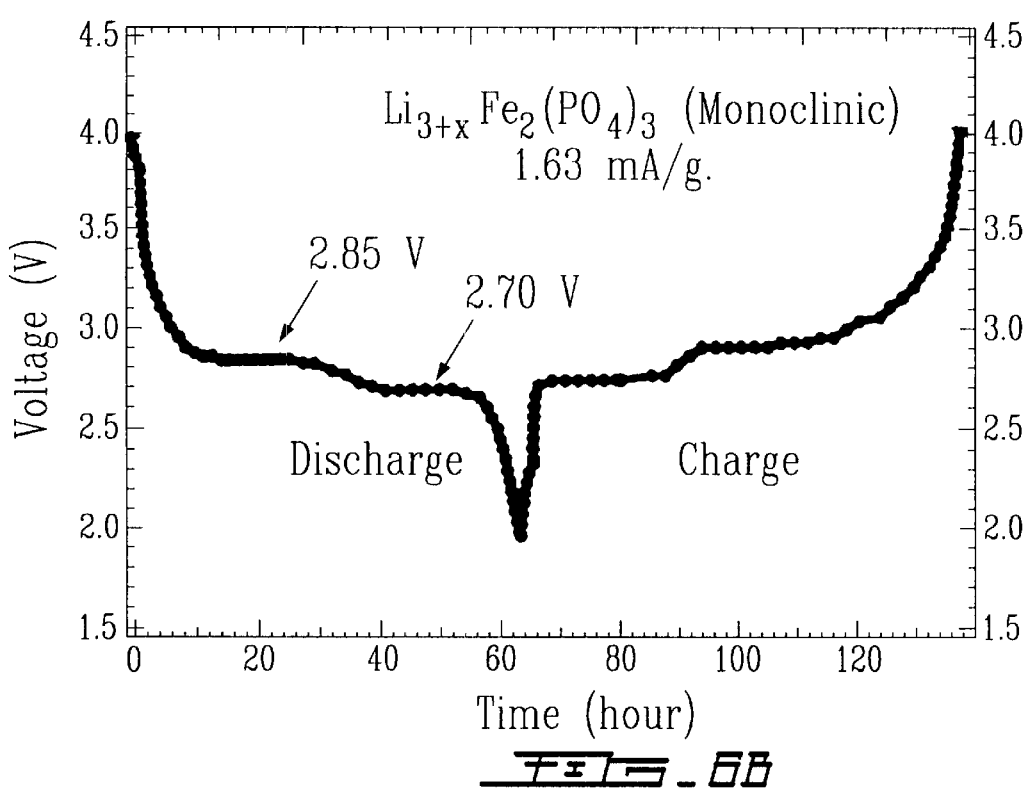

All three phosphates $Li_3M_2(PO_4)_3$, where M=Fe, Fe/V, or V, have the monoclinic $Fe_2(SO_4)_3$ structure if prepared by solid-state reaction. The inventors have found that these compounds exhibit a rhombohedral structure when prepared by ion exchange in $LiNO_3$ at 300° C. from the sodium analog $Na_3Fe_2(PO_4)_3$. The discharge/charge curve of FIG. 6A for lithium insertion into rhembohedral $Li_{3+x}Fe_2(PO_4)_3$ exhibits an average $V_{oc}$ of 2.8 V. This is surprisingly different from the curves for the monoclinic form (See FIG. 6B). The inventors have found that up to two lithiums per formula unit can be inserted into $Li_3Fe_2(PO_4)_3$, leading to $Li_5Fe_2(PO_4)_3$. The $Li^+$-ion distribution in the interstitial space of $Li_{3+x}Fe_2(PO_4)_3$, where 0<x<2, appears to vary continuously with x with a high degree of disorder. FIG. 7A shows a reversible capacity loss on increasing the current density from 0.05 to 0.5 mA·$cm^{-2}$. A reversible discharge capacity of 95 mAh·$g^{-1}$. This still observed for rhombohedral $Li_{3+x}Fe_2(PO_4)_3$ at a current density of 20 mA·$g^{-1}$. This is much reduced compared to what is encountered with the monoclinic system (See FIG. 7B). With a current density of 23 mA·$g^{-1}$ (or 1 mA·$cm^{-2}$), the initial capacity of 95 mAh·$g^{-1}$ was maintained in a coin cell up to the 40th cycle.

Another cathode material of the present invention, $Li_2FeTi(PO_4)_3$, having the NASICON framework was prepared by solid-state reaction. This material has a voltage ranging from 3.0 to 2.5 V.

Rhombohedral $TiNb(PO_4)_3$ can be prepared by solid-state reaction at about 1200° C. Up to three Li atoms per formula unit can be inserted, which allows access to the $Nb^{4+}/Nb^{3+}$ couple at 1.8 V vs. lithium for x>2 in $Li_x TiNb(PO_4)_3$. Two steps are perhaps discernible in the compositional range 0<x<2; one in the range of 0<x<1 corresponds to the $Ti^{4+}/Ti^{3+}$ couple in the voltage range 2.5 V<V<2.7 V and the other for 1<X<2 to the $Nb^{5+}/Nb^{4+}$ couple in the range 2.2 V<V<2.5 V. It appears that these redox energies overlap. This assignment is based on the fact that the $Ti^{4+}/Ti^{3+}$ couple in $Li_{1Lx}Ti_2(PO_4)_3$ gives a flat plateau at 2.5 V due to the presence of two phases, rhombohedral $LiTi_2 (PO_4)_3$ and orthorhombic $Li_3Ti_2 (PO_4)_3$. The presence of Nb in the structure suppresses the formation of the second phase in the range 0<x<2.

Rhombohedral $LiFeNb(PO_4)_3$ and $Li_2FeTi(PO_4)_3$ can be prepared by ion exchange with molten $LiNO_3$ at about 300° C. from $NaFeNb(PO_4)_3$ and $Na_2FeTi(PO_4)_3$, respectively. Two Li atoms per formula unit can be inserted reversibly into $Li_{2+x}FeTi(PO_4)_3$ with a little loss of capacity at 0.5 mA·$cm^{-2}$. Insertion of the first Li atom in the range 2.7 V<V<3.0 V corresponds to the $Fe^{3+}/Fe^{2+}$ redox couple and of the second Li atom in the range of 2.5 V<V<2.7 V to an overlapping $Ti^{4+}/Ti^{3+}$ redox couple. The insertion of lithium into $Li_{1+x}Fenb (PO_4)_3$ gives a V vs. x curve that further verifies the location of the relative positions of the $Fe^{3+}/$ $Fe^{2+}$, $Nb^{5+}/Nb^{4+}$ redox energies in phosphates with NASICON-related structures. It is possible to insert three lithium atoms into the structure; and there are three distinct plateaus corresponding to $Fe^{3+}/Fe^{2+}$ at 2.8 V, $Nb^{5+}/Nb^{4+}$ at 2.2 V, and $Nb^{4+}/Nb^{5+}$ at 1.7 V vs. lithium in the discharge curve.

Figure 9:
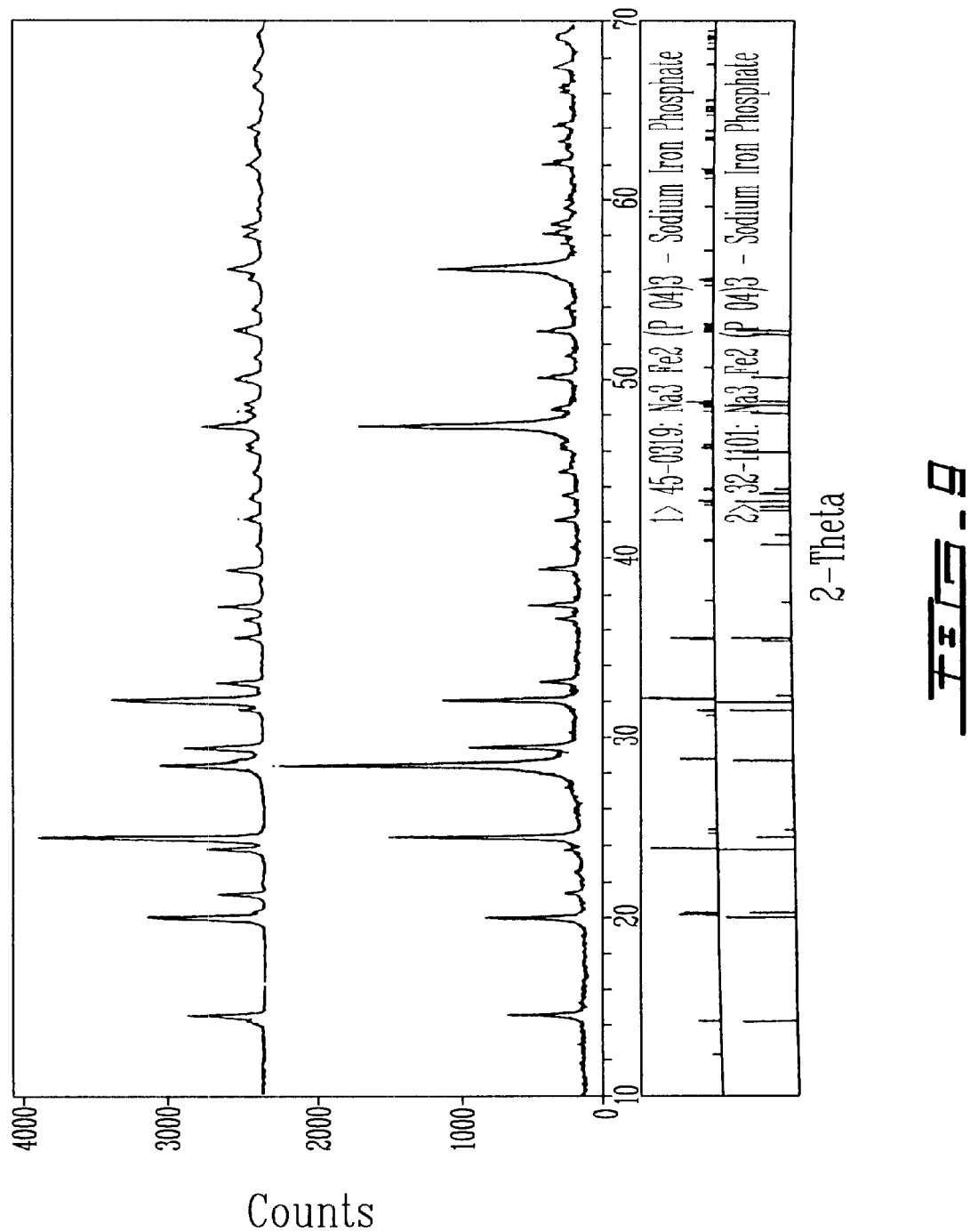
FIG. 9.

The rhombohedral $A_{3-x}V_2(PO_4)_3$ compounds of the invention can be prepared by ionic exchange from the monoclinic sodium analog $Na_3V_2(PO_4)_3$. The inventors were also able to prepare the rhombohedral $Li_2NaV_2(PO_4)_3$ with the NASICON framework by a direct solid-state reaction (FIG. 9). The discharge/charge curves at 0.05 mA·cm$^{-2}$ (0.95 mA·g$^{-1}$) for the rhombohedral $Li_xNaV_2(PO_4)_3$ are shown in FIG. 8.

Figure 10:
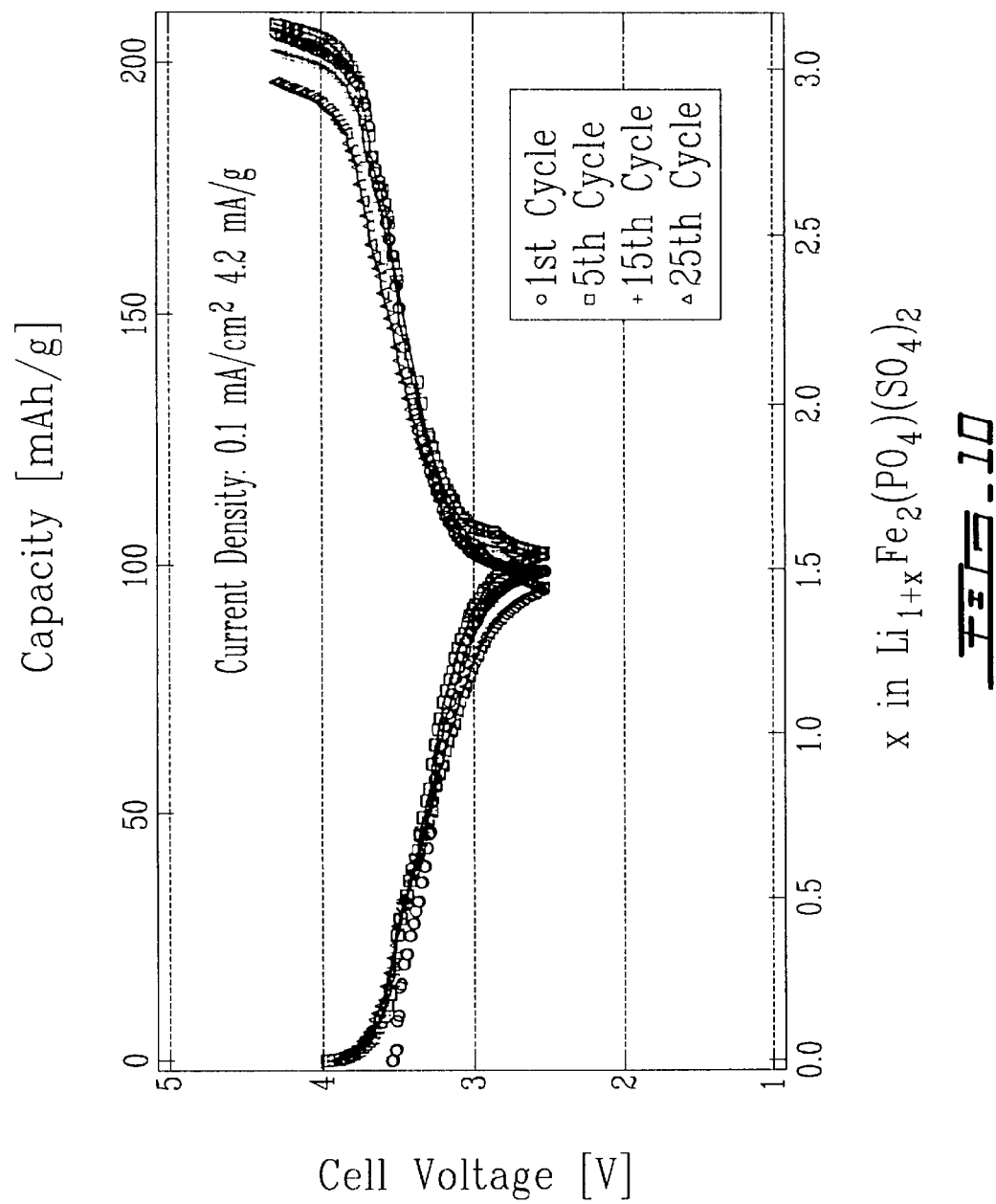
FIG. 10 FIG. 10 shows discharge/charge curves vs. lithium at 0.1 mA·cm$^{-2}$ for rhombohedral $Li_{1+x}Fe_2(PO_4)(SO_4)_2$ where $0 \leq x \leq 2$.

The rhombohedral $LiFe_2(SO_4)_2(PO_4)$ may be prepared by obtaining an aqueous solution comprising $FeCl_3$, $(NH_4)_2SO_4$, and $LiH_2PO_4$, stirring the solution and evaporating it to dryness, and heating the resulting dry material to about 500° C. Discharge/charge curves vs. lithium at 0.1 mA·cm$^{-2}$ for rhombohedral $Li_{1+x}Fe_2(PO_4)(SO_4)_2$, where 0<x<3, are shown in FIG. 10.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept spirit and scope of the invention. More specifically, it will be apparent that certain agents which are both chemically and structurally related may be substituted for the agents described herein to achieve similar results. All such substitutions and modifications apparent to those skilled in the art are deemed to be within the spirit, scope and concept of the invention as defined by the appended claims.

The following references, to the extent that they provide exemplary procedural or other details supplementary to those set forth herein, are specifically incorporated herein by reference.

Delmas, C., and A. Nadiri, *Mater. Res. Bull.*, 23. 63 (1988).
Goodenough, J. B., H. Y. P. Hong and J. A. Kafalas, *Mater. Res. Bull.* 11, 203, (1976).
Guyomard, D. and J. M. Tarascon, *J. Electrochem. Soc.*, 139, 937 (1992).
Long, G. J., G. Longworth, P. Battle, A. K. Cheetham, R. V. Thundathil and D. Beveridge, *Inorg. Chem.*, 18, 624 (1979).
Manthiram, A., and J. B. Goodenough, *J. Power Sources*, 26, 403 (1989).
Masquelier, C., M. Tabuchi, K. Ado, R. Kanno, Y. Kobayashi, Y. Maki, O. Nakamura and J. B. Goodenough, *J. Solid State Chem.*, 123, 255 (1996).
Mizushima, K., P. C. Jones, P. J. Wiseman and J. B. Goodenough, *Mater. Res. Bull*, 15, 783 (1980).
Nanjundaswamy, K. S., et al., "Synthesis, redox potential evaluation and electrochemical characteristics of NASICON-related 3D framework compounds," *Solid State Ionics*, 92 (1996) 1–10.
Nishi, Y., H. Azuma and A. Omaru, U.S. Pat. No. 4,959,281, Sep. 25, 1990.
Okada, S., K. S. Nanjundaswamy, A. Manthiram and J. B. Goodenough, *Proc. 36th Power Sources Conf.*, Cherry Hill at N.J. (Jun. 6–9, 1994).
Schöllhorn, R. and A. Payer, *Agnew. Chem.* (Int. Ed. Engl.), 24, 67 (1985).
Sinha, S. and D. W. Murphy, *Solid State Ionics*, 20, 81 (1986).
Thackeray, M. M. W. I. F. David, J. B. Goodenough and P. Groves, *Mater. Res. Bull.*, 20, 1137 (1983).
Thackeray, M. M., P. J. Johnson, L. A. de Piciotto, P. G. Bruce and J. B. Goodenough, *Mater. Res. Bull.*, 19, 179 (1984).
Thackeray, M. M., W. I. F. David. P. G. Bruce and J. B. Goodenough, *Mater. Res. Bull.* 18, 461 (1983).
Wang, S., and S. J. Hwu. Chem. of Mater., 4, 589 (1992).

What is claimed is:

1. A cathode material for a rechargeable electrochemical cell, said cell also comprising an anode and an electrolyte, the cathode material comprising a rhombohedral NASICON material having the formula $$Y_xM_2(PO_4)_y(SO_4)_{3-y}$$

where $0 \leq y \leq 3$, M is a single transition-metal atom, 0<x<5, and Y is one or both of Li and Na.

2. The cathode material of claim 1, wherein the cathode material comprises a rhombohedral NASICON material having the formula $$Li_xFe_2(PO_4)_{3-z}(SO_4)_z$$

where $0 \leq x \leq 5$, and 0<z<3.

3. The cathode material of claim 1, wherein the cathode material comprises a rhombohedral NASICON material having the formula $$Li_xNaV_2(PO_4)_{3-z}(SO_4)_z$$

where 0<x<2, and 0<z<2.

* * * * *

UNITED STATES PATENT AND TRADEMARK OFFICE
CERTIFICATE OF CORRECTION

PATENT NO. : 6,391,493 B1
DATED : May 21, 2002
INVENTOR(S) : Goodenough, John B. et al.

It is certified that error appears in the above-identified patent and that said Letters Patent is hereby corrected as shown below:

<u>Title page,</u>
Item [75], Inventors, -- Padhi -- instead of "Pahdi"

Signed and Sealed this

Twenty-second Day of February, 2005

JON W. DUDAS
*Director of the United States Patent and Trademark Office*